US012467276B2

(12) United States Patent
Overbeeke

(10) Patent No.: US 12,467,276 B2
(45) Date of Patent: Nov. 11, 2025

(54) CYLINDER LOCK ASSEMBLY

(71) Applicant: M & C PROTECT B.V., Didam (NL)

(72) Inventor: Cornelis Jacobus Johannes Marinus Overbeeke, Wehl (NL)

(73) Assignee: M & C PROTECT B.V., Didam (NL)

( * ) Notice: Subject to any disclaimer, the term of this patent is extended or adjusted under 35 U.S.C. 154(b) by 80 days.

(21) Appl. No.: 18/579,118

(22) PCT Filed: Jul. 15, 2022

(86) PCT No.: PCT/NL2022/050417

§ 371 (c)(1),
(2) Date: Jan. 12, 2024

(87) PCT Pub. No.: WO2023/287293

PCT Pub. Date: Jan. 19, 2023

(65) Prior Publication Data

US 2024/0328195 A1 Oct. 3, 2024

(30) Foreign Application Priority Data

Jul. 16, 2021 (NL) ..................................... 2028758

(51) Int. Cl.
*E05B 9/04* (2006.01)

(52) U.S. Cl.
CPC ........ *E05B 9/045* (2013.01); *E05B 2009/046* (2013.01)

(58) Field of Classification Search
CPC ........................... E05B 9/045; E05B 2009/046
See application file for complete search history.

(56) References Cited

U.S. PATENT DOCUMENTS 4,083,212 A * 4/1978 Proefrock ........... E05B 17/0062 70/366
4,880,262 A * 11/1989 Mugnolo ................ E05C 3/042 292/202

(Continued)

FOREIGN PATENT DOCUMENTS

DE 203 20 698 U1 4/2005
EP 2 336 460 A1 6/2011

OTHER PUBLICATIONS

International Search Report, issued in PCT/NL2022/050417, dated Oct. 4, 2022.

(Continued)

*Primary Examiner* — Mark A Williams
(74) *Attorney, Agent, or Firm* — Birch, Stewart, Kolasch & Birch, LLP

(57) ABSTRACT

A cylinder lock assembly for forming a cylinder lock for attachment in a panel, such as, for example, a door, includes an inner lock housing part, an outer lock housing part, at least one bridge, a carrier, an outer cylinder, an inner cylinder, a carrier coupling, an operating knob, and a set of lock housing extension parts. The cylinder lock includes a selection from the set of the lock housing extension parts connected with the inner lock housing part in order to obtain a desired length of the inner lock housing part with the lock housing extension parts. This desired length is adaptable by changing the number of lock housing extension parts within the selection and/or selecting a lock housing extension part of a desired thickness. The selection from the set of the lock housing extension parts is positioned between the inner lock housing part and the operating knob.

16 Claims, 3 Drawing Sheets

(56) References Cited

U.S. PATENT DOCUMENTS

| | | | | |
|---|---|---|---|---|
| 4,934,164 | A * | 6/1990 | Shew | E05B 27/0032 70/491 |
| 2002/0095964 | A1 * | 7/2002 | Davis | E05B 15/0053 70/278.3 |
| 2004/0040355 | A1 * | 3/2004 | Goldman | E05B 47/0615 70/277 |
| 2008/0028808 | A1 | 2/2008 | Keller | |
| 2009/0308117 | A1 * | 12/2009 | Goldman | E05B 47/0615 70/277 |
| 2011/0072868 | A1 * | 3/2011 | Haviv | E05B 27/006 70/357 |
| 2015/0284975 | A1 * | 10/2015 | Karsil | E05B 17/0062 70/344 |
| 2016/0032618 | A1 * | 2/2016 | Field | E05B 27/0082 70/352 |
| 2016/0108642 | A1 * | 4/2016 | Loukeris | E05B 17/047 70/375 |
| 2016/0145900 | A1 * | 5/2016 | Kaiser | H02K 7/116 70/283.1 |

OTHER PUBLICATIONS

Written Opinion of the International Searching Authority, issued in PCT/NL2022/050417, dated Oct. 4, 2022.

* cited by examiner

CYLINDER LOCK ASSEMBLY

The invention relates to a cylinder lock assembly for forming a cylinder lock for attachment in a panel, such as, e.g., a door.

BACKGROUND

A standard cylinder lock comprises inter alia a lock housing with a rotatable cylinder received therein and a carrier. By rotating the cylinder, the carrier rotates along with it. Due to the carrier being connected with, e.g., the deadbolt, the cylinder lock is thereby locked, or unlocked. The cylinder can be an outer cylinder, which is merely rotatable if the right key is inserted in the outer cylinder. Cylinders may also be connected with an operating knob with the aid of which the rotation of the cylinder can be brought about. Keys and operating knobs are generally moved manually. By rotation of the key or operating knob, the cylinder lock is locked or unlocked.

Due to an increase of home electronics in and around houses, so-called smart locks are on the rise. A smart lock is a lock which can be locked and unlocked automatedly, for instance through the actuating of a motor which brings about the rotation of a cylinder and the carrier connected therewith. The actuation may for instance be done by utilizing a smartphone which transmits a wireless signal and thereby sets the motor into operation. When a smartphone with the right NFC tag is held near the smart lock, the lock can thereby be unlocked.

There are also smart operating units, these are solutions by which a conventional cylinder lock can be converted to a smart lock. They consist, for instance, of a set-up unit which can be attached to an inner side of a panel in which the cylinder lock is mounted. To have the inner cylinder, sitting on the inner side of the cylinder lock, rotate, a fitting key is inserted into the lock. The set-up unit is placed over it and is configured for having the key rotate to thereby lock and/or unlock the cylinder lock.

SUMMARY

A disadvantage of such a set-up unit is that a key is sitting in the inner cylinder permanently. With some cylinder locks it is not possible to rotate the outer cylinder when a key is sitting in the inner cylinder. If such a cylinder lock is provided with the above described set-up unit, it is not possible anymore to lock and unlock the cylinder lock from the outside with a key. Obviously, this is unpractical and undesirable.

There is therefore a need for a cylinder lock that does not have this disadvantage. In themselves, such locks are known, they are locks having so-called hotel functionality. When a hotel room tenant dwells in his room and has left the key sitting in the inner side of the door to his room, hotel staff can nonetheless operate the door from the outside with a key. To that end, the known cylinder lock is provided with a carrier coupling with hotel functionality, so that, with key inserted, the outer cylinder of the lock is non-rotatably coupled with the carrier and upon rotation of the key the carrier of the lock rotates along. With outer key non-inserted, the outer cylinder is rotationally uncoupled from the carrier so that the carrier is unhinderedly rotatable by rotation of the inner cylinder. The room tenant who is in the room can therefore, in that condition, unlock the door to his room from the inside with the key, even though there is no outer key in the outer cylinder of the lock.

A remaining problem, however, is that in practice there are many different types of doors of different thicknesses. For a private individual, it is not easy to find the right cylinder lock having the right length. Although there are also locks known that are length adjustable, the lock, to that end, has to be dismounted to quite an extent, which is generally too much of a challenge for a private individual.

There is therefore a need for a cylinder lock assembly for making therefrom a cylinder lock whose carrier is lockable and unlockable from the outside with a key, and wherein the length of the cylinder lock can be simply adapted by a private individual to the thickness of the door in which the lock is to be mounted.

To that end, the invention provides a cylinder lock assembly according to claim 1. More particularly, the invention provides a cylinder lock assembly for forming a cylinder lock for attachment in a panel, such as, e.g., a door, wherein the cylinder lock assembly comprises:

an inner lock housing part with a first end and an opposite second end;

an outer lock housing part;

at least one bridge;

a carrier;

an outer cylinder;

an inner cylinder;

a carrier coupling;

an operating knob;

a set of lock housing extension parts, wherein the cylinder lock which is made from the cylinder lock assembly is built up from a selection of the aforementioned parts as follows:

the inner lock housing part is connected with the outer lock housing part with the aid of the bridge;

the outer cylinder is received in the outer lock housing part and is provided with lock pins received therein in a manner slidable in radial direction, which lock pins with key non-inserted hinder rotation of the outer cylinder and with key inserted are slid in radial direction, so that the outer cylinder is rotatable around a cylinder axis relative to the outer lock housing part;

the inner cylinder is received in the inner lock housing part in a manner rotatable around the cylinder axis and at a first end thereof is non-rotatably coupled with the carrier;

the carrier is received between the inner lock housing part and the outer lock housing part in a manner rotatable around the cylinder axis of the cylinder lock;

the carrier coupling is provided with a so-called hotel functionality, so that with key inserted the outer cylinder is non-rotatably coupled with the carrier and upon rotation of the key the carrier rotates along, and with key non-inserted the outer cylinder is rotationally uncoupled from the carrier so that the carrier is unhinderedly rotatable by rotation of the inner cylinder;

the operating knob is non-rotatably coupled to a second end of the inner cylinder, opposite the first end, for the purpose of rotating the inner cylinder;

a selection from the set of the lock housing extension parts is connected with the inner lock housing part at the second end of the inner lock housing part in order to obtain a desired length of the inner lock housing part with the lock housing extension parts, wherein this desired length is adaptable by changing the number of lock housing extension parts within the selection and/or selecting a lock housing extension part having a desired thickness from the set of lock housing extension parts, wherein the selection from the set of the lock housing extension parts is positioned between the inner lock housing part and the operating knob.

Such a cylinder lock can be applied in combination with different panels, such as, e.g., doors of different thicknesses, for instance in replacement of existing cylinder locks in those panels. The user can use a key to open the panel from the outside, by inserting this key in the outer cylinder of the outer lock housing part. From the inside, the carrier can be rotated by having the operating knob rotate. This operating knob can be operated by a smart operating unit implemented as a set-up unit. The cylinder lock can then be operated as a smart lock, for instance by holding a smartphone near it. Due to the cylinder lock being provided with a carrier coupling with hotel functionality, the carrier can always be unlocked and locked by the operating knob which is coupled with the operating unit implemented as a set-up unit. When a user inserts a key into the lock from the outside, a coupling between the outer cylinder and the carrier is brought about and the lock can be conventionally locked and unlocked from the outside with the key.

With the aid of the cylinder lock assembly according to the invention a wide variety of cylinder locks, that is, cylinder locks with a great variety of lengths, can be replaced to thereby make the panel suitable for operation with an operating unit implemented as a set-up unit. By means of the lock housing extension parts, it is possible in a simple manner to compose a cylinder lock of a desired length by a suitable selection of lock housing extension parts, viz., so that the length of the new cylinder lock corresponds to the length of the cylinder lock to be replaced. Obtaining the desired length can be simply realized by choosing the lock housing extension parts of the right thickness. The thickness is understood to be the dimension the lock housing extension part has as viewed in the direction of the cylinder axis. The selection can comprise no lock housing extension parts, one lock housing extension part, or a plurality of lock housing extension parts. The selection of lock housing extension parts may be attached, for instance by a screw, to the second end of the inner lock housing part. Such an attachment is simple and can be executed by a consumer himself or herself. For that, it is not necessary to dismount the inner lock housing part from the bridge. Fastening of the lock housing extension parts takes place at the free, accessible second end of the inner lock housing part. Such a length adaptation can therefore be simply carried out by a private individual.

Further elaborations of the invention are described in the dependent claims and will hereinafter be further clarified on the basis of an example, with reference to the figures.

DETAILED DESCRIPTION OF THE FIGURES

Figure 1:
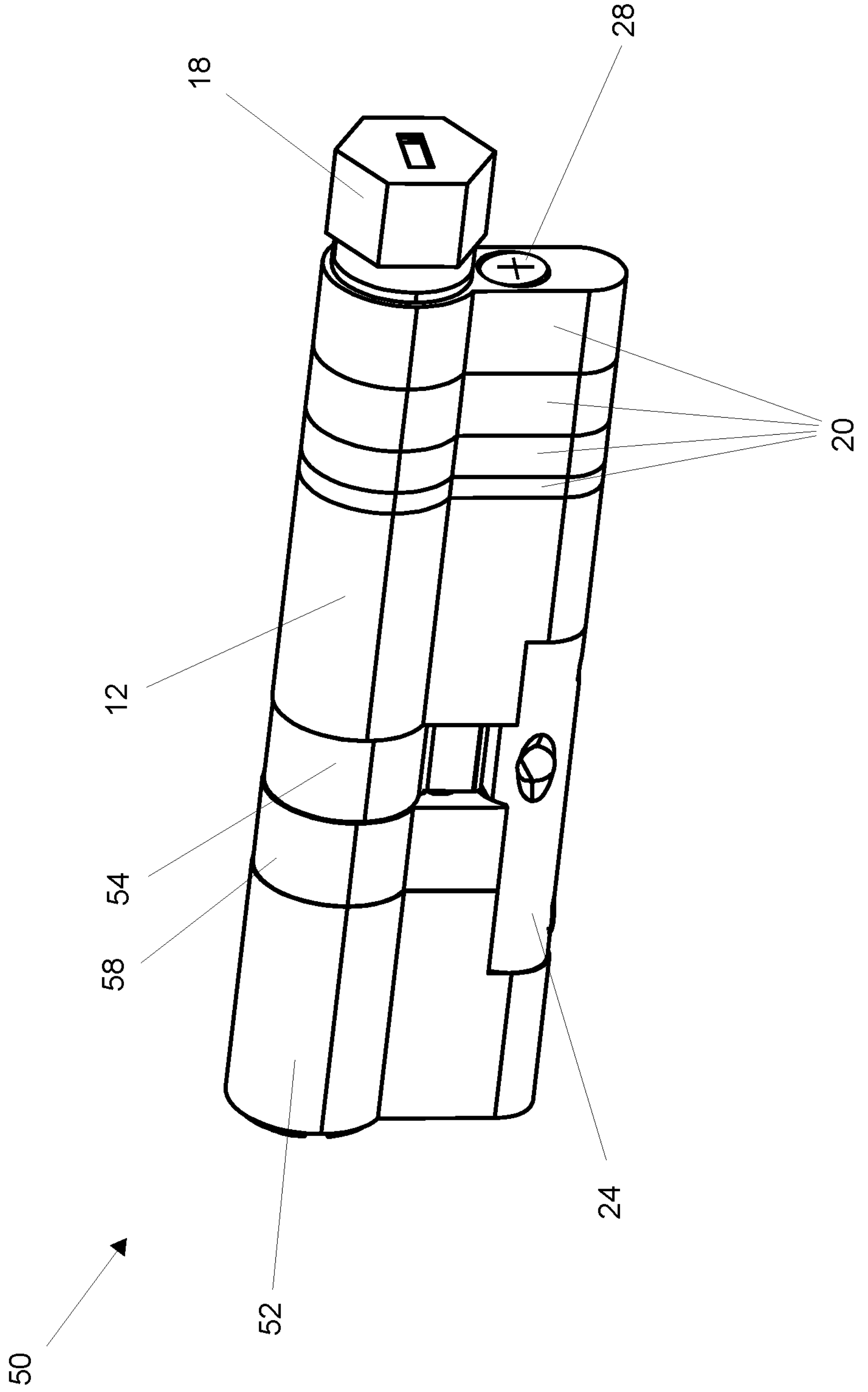
FIG. 1 shows a perspective view of an example of a cylinder lock according to the invention.

In the following detailed description of the figures, with the aid of reference numerals, reference is made to the example that is represented in the figures. The embodiments that are described in the detailed description, however, are not limited to the example that is shown in the figures but may also be implemented in a different way than shown in the example. The embodiments described in the detailed description should therefore be read and understood also without the reference numerals. The various embodiments to be described hereinafter can be used in combination with each other or independently of each other.

Most generally, the invention provides a cylinder lock assembly 10 for forming a cylinder lock 50 for attachment in a panel, such as, e.g., a door. The cylinder lock assembly 10 comprises:

- an inner lock housing part 12 having a first end and an opposite second end;
- an outer lock housing part 52;
- at least one bridge 24;
- a carrier 54;
- an outer cylinder 56;
- an inner cylinder 14;
- a carrier coupling 45;
- an operating knob 18;
- a set of lock housing extension parts 20.

Figure 2:
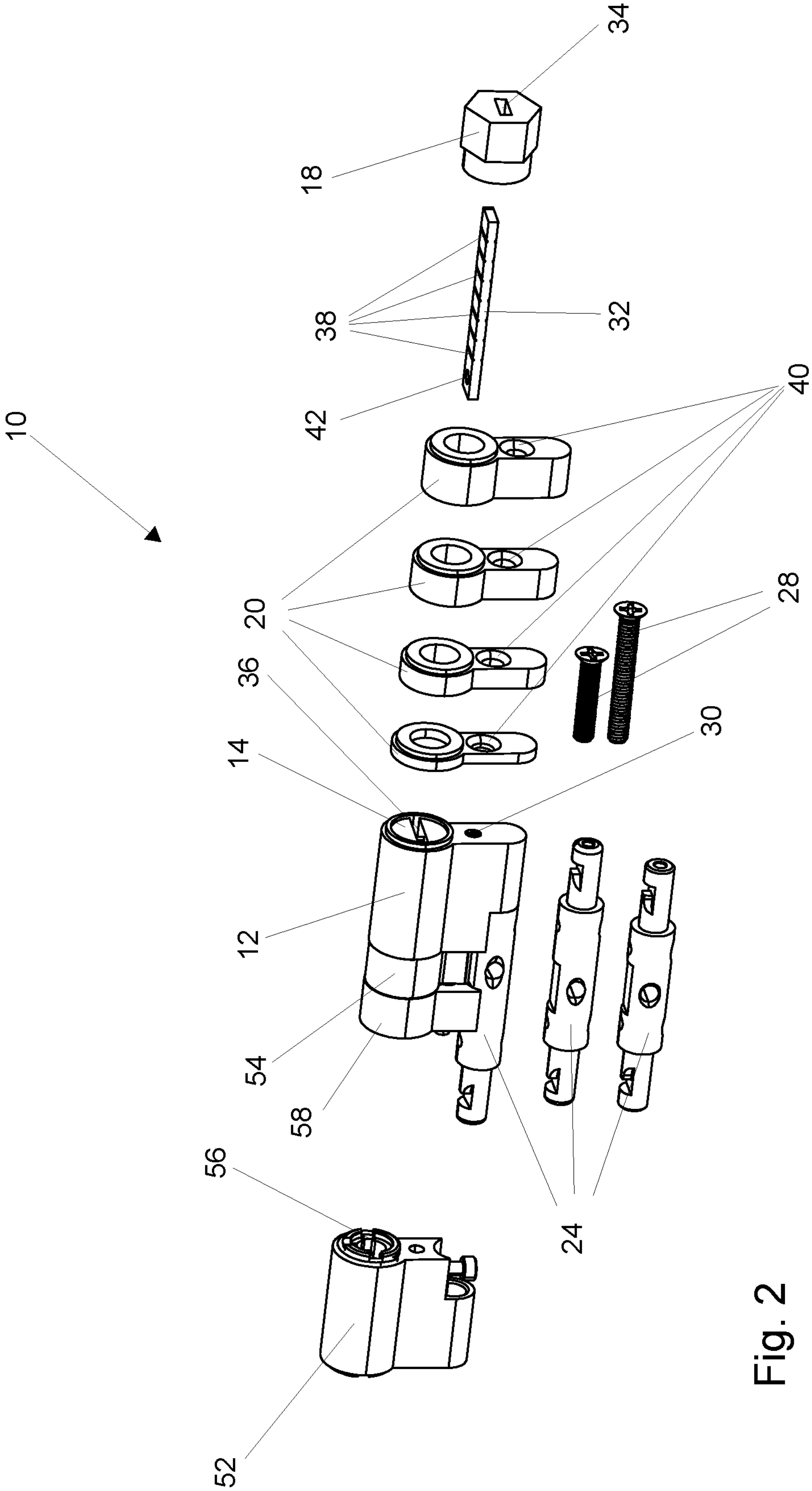
FIG. 2 shows an exploded view of the example of FIG. 1.

An example of the cylinder lock assembly 10 is represented in FIG. 2.

The cylinder lock 50 which is made from the cylinder lock assembly 10 is built up from a selection of the aforementioned parts as follows:

- the inner lock housing part 12 is connected with the outer lock housing part 52 with the aid of the bridge;
- the outer cylinder 56 is received in the outer lock housing part 52 and is provided with lock pins received therein in a manner slidable in radial direction, which lock pins, with key non-inserted, hinder rotation of the outer cylinder 56 and, with key inserted, are slid in radial direction, so that the outer cylinder 56 is rotatable around a cylinder axis 16 relative to the outer lock housing part 52;
- the inner cylinder 14 is received in the inner lock housing part 12 in a manner rotatable around the cylinder axis 16 and at a first end thereof is non-rotatably coupled with the carrier 54;
- the carrier 54 is received between the inner lock housing part 12 and the outer lock housing part 52 in a manner rotatable around the cylinder axis 16;
- the carrier coupling 45 includes a so-called hotel functionality, so that, with key inserted, the outer cylinder 56 is non-rotatably coupled with the carrier 54 and upon rotation of the key the carrier 54 rotates along and, with key non-inserted, the outer cylinder 56 is rotationally uncoupled from the carrier 54 so that the carrier 54 is unhinderedly rotatable by rotation of the inner cylinder 14;
- the operating knob 18 is non-rotatably coupled to a second end, opposite the first end, of the inner cylinder 14 for the purpose of rotating the inner cylinder 14;
- a selection from the set of the lock housing extension parts 20 is connected with the inner lock housing part 12 at the second end of the inner lock housing part 12 in order to obtain a desired length 22 of the inner lock housing part 12 with the lock housing extension parts 20, wherein this desired length 22 is adaptable by changing the number of lock housing extension parts 20 within the selection and/or selecting a lock housing extension part 20 having a desired thickness from the set of lock housing extension parts 20, wherein the selection from the set of the lock housing extension parts 20 is positioned between the inner lock housing part 12 and the operating knob 18.

Figure 3:
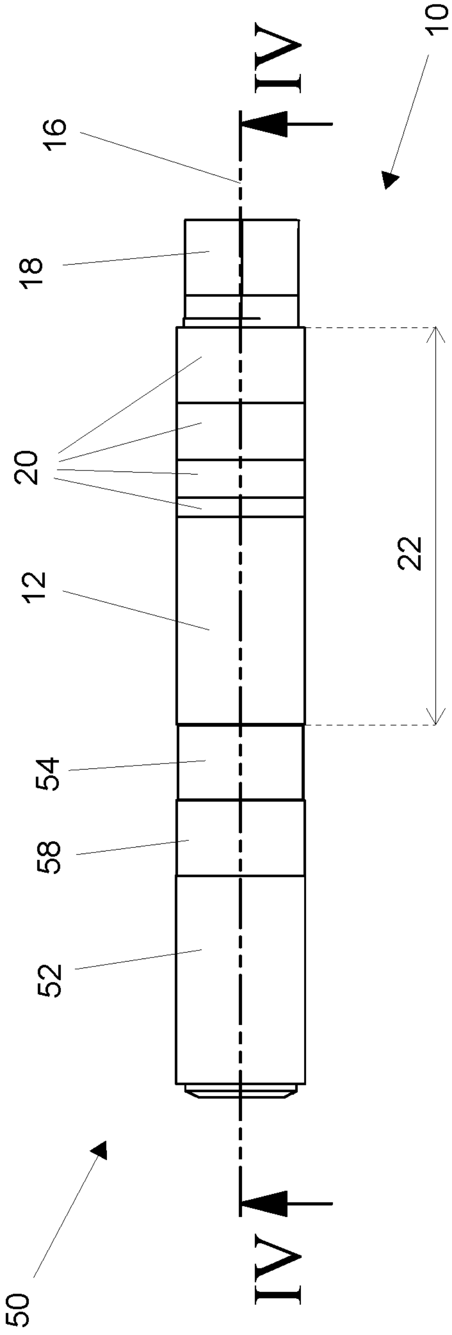
FIG. 3 shows a top plan view of the example of FIGS. 1 and 2.
Figure 4:
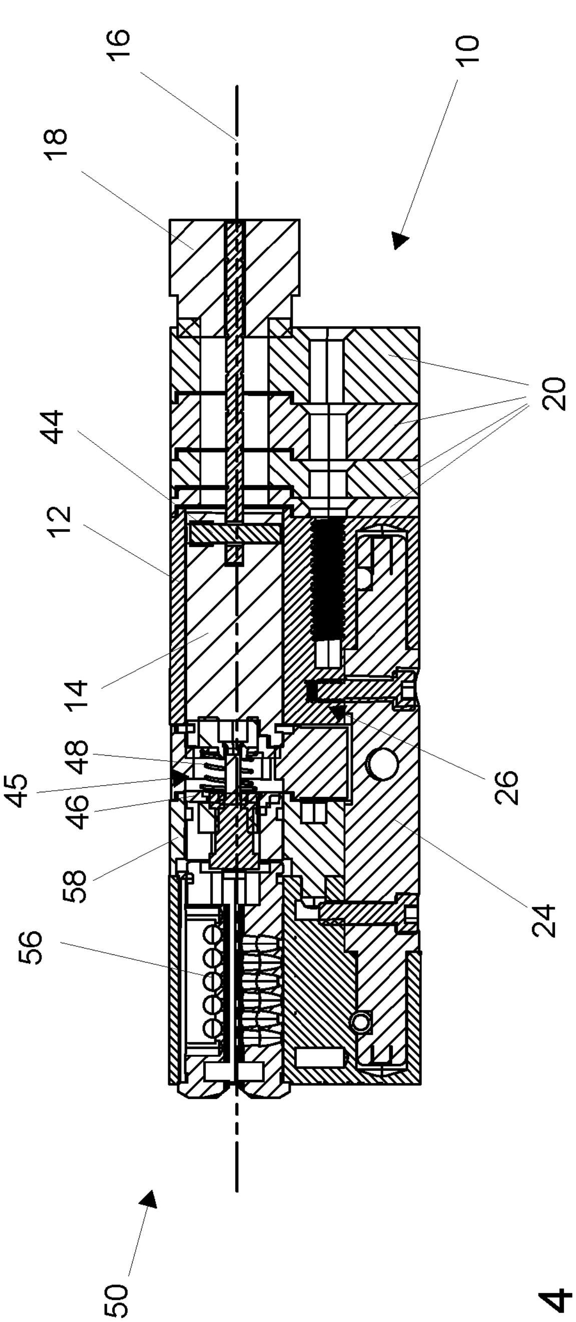
FIG. 4 shows a cross section along line IV-IV in FIG. 3.

An example of a thus built-up cylinder lock 50 is represented in FIGS. 1, 3 and 4.

By replacing an existing cylinder lock with a cylinder lock 50 which is made from a cylinder lock assembly 10 according to the present invention and by mounting on the operating knob 18 thereof a smart operating unit, a panel with a conventional lock can be converted to a panel with a smart lock. The cylinder lock 50 is then openable from the outside by inserting a fitting key into the outer cylinder 56 of the outer lock housing part 52 and rotating it. Moreover, the cylinder lock 50 is openable by activating the smart operating unit.

Due to the desired length 22 of the cylinder lock 50 being variable, the cylinder lock 50 can be used in replacement of virtually any conventional cylinder lock. Mounting an electronic operating unit implemented as a set-up unit is possible without the key then needing to be placed in the inner side of the lock. Because the carrier coupling 45 with hotel functionality normally does not rotationally couple the outer cylinder 56 with the carrier 54, the cylinder lock 50 can always be unlocked and locked with the electronic operating unit. Only when a key is inserted into the outer cylinder 56 does a rotational coupling between the outer cylinder 56 and the carrier 54 come about, so that it is possible to lock or unlock the cylinder lock 50 from the outside manually, that is, with a key. Under that circumstance, the operating knob 18 on the inner side will simply rotate along and the electronic operating unit allows this because it is not energized at that moment.

In this manner, virtually any conventional cylinder lock in a panel of any thickness can be replaced with the cylinder lock 50, smartly operable with an electronic operating unit implemented as a set-up unit, which has been built up from the cylinder lock assembly 10 and, through selection of the right lock housing extension parts 20, has a right length matching the thickness of the panel.

The other effects and advantages of the cylinder lock assembly 50 have already been described in the summary and these effects and advantages are considered inserted here by reference.

In an embodiment, the lock housing extension parts 20 from the set of lock housing extension parts 20 have mutually different thicknesses. The thickness is the dimension of the lock housing extension part 20 viewed in the direction of the cylinder axis 16. By combining the mutually different thicknesses, the number of possibilities of varying the desired length 22 is augmented. By cleverly choosing the mutual differences, it is possible to obtain any desired length 22 within a defined range. An example of different thicknesses of lock housing extension parts 20 from the set of lock housing extension parts 20 is 1, 2, 4, and 8 mm. Through the right combination of lock housing extension parts 20, it is thus possible in steps of 1 mm to make each length from 0 through 15 mm of the lock housing extension parts 20. The desired length 22 can thus be varied with 15 mm.

In an embodiment, the inner lock housing part 12 and the selection of lock housing extension parts 20 are connected with each other by means of a lock housing screw 28. The inner lock housing part 12 may be provided with a screw hole 30 for receiving the lock housing screw 28. The cylinder lock assembly 10 may comprise a set of lock housing screws 28 of different lengths, one of which is used in the cylinder lock 50 depending on the desired length obtained by the selection of the lock housing extension parts 20.

To be able to fasten lock housing extension parts 20, they may be provided with a screw feed-through aperture 40. An example of this is shown in FIG. 2. The lock housing screw 28 can be inserted through the screw feed-through aperture 40 or screw feed-through apertures 40 of the one or more lock housing extension parts 20 and be screwed tight in the screw hole 30 of the inner lock housing part 12. Thus a strong, reversible connection of the inner lock housing part 12 with the lock housing extension part 20 or lock housing extension parts 20 comes about.

In an embodiment, the cylinder lock assembly 10 further comprises a coupling bar 32 for realization of the non-rotatable connection between the operating knob 18 and the inner cylinder 14. A first end of the coupling bar 32 is non-rotatably connected with the operating knob 18. A second end of the coupling bar 32 is non-rotatably connected with the inner cylinder 14. In the example shown, the coupling bar 32 has a rectangular cross section. The first end of the coupling bar 32 is inserted into a slot 34 in the operating knob 18 and a second, opposite end of the coupling bar is inserted into a slot 36 of the inner cylinder 14. The coupling bar 32 may be provided with weakened zones 38 for breaking off the coupling bar 32 at a length that matches the desired length 22 mentioned.

The coupling bar 32, at the end that extends into the slot 36 in the inner cylinder 14, may be provided with a pin hole 42. The inner cylinder 14 may be provided with a pin 44 which, if the coupling bar 32 extends into the slot 36 in the inner cylinder 14, extends through the pin hole 42. This creates a pin-in-hole connection which hinders a movement of the coupling bar 32 in longitudinal direction, i.e., parallel to the cylinder axis 16.

In an embodiment, the operating knob 18 has a hexagonal profile in a plane perpendicular to the cylinder axis 16.

As shown in FIGS. 1 and 2, the profile can be a regular hexagon. A hexagonal profile can be simply coupled with an electronic operating unit implemented as a set-up unit.

In an embodiment, as shown in FIGS. 1 and 2, the at least one bridge 24 of the cylinder lock assembly 10 comprises a set of bridges 24 of different lengths. The bridge 24 of the cylinder lock 50 made from the cylinder lock assembly 10 is selected from the set of bridges 24.

The bridge 24 connects the inner lock housing part 12 with the outer lock housing part 52, the carrier 54 being received between the inner lock housing part 12 and the outer housing lock part 52. Depending on the desired distance from the carrier 54 to the outer side of the panel in which the cylinder lock 50 is received, the bridge 24 which matches that distance can be selected from the set of bridges 24.

In an embodiment, an example of which is shown in the figures, the cylinder lock assembly 10 can further comprise a set of extension coupling pieces 58. The cylinder lock 50 made from the cylinder lock assembly 10 can comprise a selection of zero or more extension coupling pieces 58 from the set of extension coupling pieces 58. The selection of extension coupling pieces 58 is received between the carrier 54 and the outer lock housing part 52 with the outer cylinder 56 received therein. The selection of zero or more extension coupling pieces 58 matches the length of the bridge 24 selected for the cylinder lock 50 and hence matches the distance between the carrier 54 and the outer side of the door or the panel in which the cylinder lock 50 is to be received.

In an embodiment, an example of which is shown in the figures, the inner lock housing part 12 may be provided with a bridge screw hole 26 for attachment of the inner lock housing part 12 to the bridge 24. Similarly, the outer lock housing part 52 may be provided with a bridge screw hole for attachment of the outer lock housing part 52 to the bridge 24. Thus the inner lock housing part 12 and the outer lock housing part 52 can simply, even by a private individual, be connected with the bridge 24 of suitably chosen length.

In an embodiment, an example of which is shown in the figures, the carrier coupling 45 can comprise a coupling disc 46 which is forced out of engagement with the carrier under the influence of spring action by a spring 48 and which, with key inserted, is displaced, against spring action, in axial direction in the direction of the carrier 54 and thus realizes a non-rotatable coupling between the outer cylinder 56 and the carrier 54.

In consequence of this, the carrier 54 is generally rotationally uncoupled from the outer cylinder 56, so that the electronic operating unit can rotate the carrier 54. Only when a key is inserted into the outer cylinder 56 does a rotational coupling come about between the outer cylinder 56 and the carrier 54 and can the carrier 54 be rotated with the key and hence the lock be locked or unlocked.

In an embodiment, the inner lock housing part 12, viewed in the direction of the cylinder axis, has a substantially constant profile. Each lock housing extension part 20 of the set of lock housing extension parts 20, viewed in the direction of the cylinder axis, has a substantially constant profile which corresponds to the profile of the inner lock housing part 12.

In an embodiment, as shown in the figures, the inner lock housing part 12, viewed in the direction of the cylinder axis, has a substantially constant profile. The outer lock housing part 52, viewed in the direction of the cylinder axis, also has a substantially constant profile. The profile of the outer lock housing part 52 corresponds to the profile of the inner lock housing part 12 and the profiles of the two lock housings 12, 52 are in line with each other.

Due to the profiles being correspondent and in line with each other, the cylinder lock 50 can be simply mounted or fastened in the existing cylinder lock opening in a panel. The profile can be, e.g., a Euro profile. A Euro profile has standardized dimensions, which makes it possible for a cylinder lock 50 built up from the cylinder lock assembly 10 to be used in replacement of cylinder locks from different manufacturers.

The invention is not limited to the examples shown in the figures. The above described embodiments, as already indicated, may also be implemented differently than shown in the examples of the figures. The scope of protection is defined by the appended claims in which the reference numerals have no limiting effect.

KEY TO SYMBOLS

10—cylinder lock assembly
12—inner lock housing part
14—inner cylinder
16—cylinder axis
18—operating knob
20—lock housing extension part
22—desired length
24—bridge
26—bridge screw hole
28—lock housing screw
30—screw hole
32—coupling bar
34—slot (in operating knob)
36—slot (in cylinder)
38—weakened zone
40—screw feed-through aperture
42—bar hole
44—pin
45—carrier coupling
46—coupling disc
48—spring
50—cylinder lock
52—outer lock housing part
54—carrier
56—outer cylinder
58—extension coupling piece

The invention claimed is:

1. A kit of parts configured to be assembled to form in an assembled condition a cylinder lock attachable in a panel, comprising:

an inner lock housing part having a first axial end and an opposite second axial end along a longitudinal axis of the inner lock housing part, the inner lock housing part being configured to be positioned on an interior side of the panel;

an outer lock housing part configured to be positioned on an exterior side, opposite to the interior side, of the panel;

at least one bridge;

a carrier;

an outer cylinder;

an inner cylinder;

a carrier coupling;

an operating knob; and a set of lock housing extension parts, wherein, in the assembled condition:

the inner lock housing part is connected with the outer lock housing part by a selected bridge from the at least one bridge;

the outer cylinder is received in the outer lock housing part and is provided with lock pins received therein in a manner slidable in a radial direction which is perpendicular to the longitudinal axis of the inner lock housing part and extends from or towards the longitudinal axis of the inner lock housing part, wherein the lock pins are configured to hinder rotation of the outer cylinder when no key is inserted, and are configured to slide radially in the radial direction upon a key insertion, thereby enabling rotation of the outer cylinder around the longitudinal axis of the inner lock housing part relative to the outer lock housing part;

the inner cylinder is received in the inner lock housing part in a manner rotatable around the longitudinal axis of the inner lock housing part and has a first axial end and a second axial end along a longitudinal axis of the inner lock housing part, the first axial end of the inner cylinder being non-rotatably coupled with the carrier;

the carrier is received between the inner lock housing part and the outer lock housing part in a manner rotatable around the longitudinal axis of the inner lock housing part;

the carrier is configured to be non-rotatably coupled with the outer cylinder upon the key insertion, and thereby rotate along with rotation of the inserted key, and the carrier is further configured to be rotationally independent of the outer cylinder when no key is inserted, allowing the carrier to rotate freely relative to the outer cylinder by rotation of the inner cylinder;

the operating knob is non-rotatably coupled to the second axial end, opposite the first axial end, of the inner cylinder for rotating the inner cylinder; and the kit of parts is configured in such a manner that one or more lock housing extension parts from the set of the lock housing extension parts is selectively connected with the inner lock housing part at the second axial end of the inner lock housing part during assembly of the cylinder lock in order to obtain a desired length of the inner lock housing part including the selected lock housing extension parts, wherein the desired length is adaptable by changing a number of lock housing extension parts and/or selecting a lock housing extension part of a desired thickness from the set of lock housing extension parts during assembly of the cylinder lock, wherein the one or more lock housing extension parts selected during assembly of the cylinder lock are positioned between the inner lock housing part and the operating knob.

2. The kit of parts according to claim 1, wherein the lock housing extension parts from the set of lock housing extension parts have mutually different thicknesses.

3. The kit of parts according to claim 1, wherein the inner lock housing part and the one or more lock housing extension parts are connected with each other by means of a lock housing screw.

4. The kit of parts according to claim 3, wherein the inner lock housing part is provided with a screw hole for receiving the lock housing screw.

5. The kit of parts according to claim 3, further comprising a set of lock housing screws having different lengths, one of the set of lock housing screws being configured to be selectively used in the cylinder lock depending on the desired length obtained through the selection of the lock housing extension parts during assembly of the cylinder lock.

6. The kit of parts according to claim 1, further comprising a coupling bar for realization of the non rotatable connection between the operating knob and the inner cylinder, the coupling bar including a first axial end and a second axial end along the longitudinal axis of the inner lock housing part, wherein the first axial end of the coupling bar is non-rotatably connected with the operating knob, and wherein the second axial end of the coupling bar is non-rotatably connected with the inner cylinder.

7. The kit of parts according to claim 6, wherein the coupling bar is provided with weakened zones configured to be breakable during assembly of the cylinder lock to enable the coupling bar to obtain a length matching said desired length.

8. The kit of parts according to claim 1, wherein the operating knob, viewed in the direction of the longitudinal axis of the inner lock housing part, has a hexagonal profile.

9. The kit of parts according to claim 1, wherein the operating knob is configured for operative connection with a smart operating unit.

10. The kit of parts according to claim 1, wherein the at least one bridge comprises a set of bridges of different lengths, wherein the selected bridge of the cylinder lock in the assembled condition is selected from the set of bridges of different lengths during assembly of the cylinder lock.

11. The kit of parts according to claim 10, wherein the kit of parts further comprises a set of extension coupling pieces, wherein the cylinder lock in the assembled condition comprises zero or more extension coupling pieces selected from the set of extension coupling pieces to be received between the carrier and the outer lock housing part with the outer cylinder received therein during assembly of the cylinder lock, and wherein a thickness of the selection of extension coupling pieces matches the length of the selected bridge from the at least one bridge selected during assembly of the cylinder lock.

12. The kit of parts according to claim 1, wherein the inner lock housing part is provided with a bridge screw hole for attachment of the inner lock housing part to the selected bridge from the at least one bridge and wherein the outer lock housing part is provided with a bridge screw hole for attachment of the outer lock housing part to the selected bridge from the at least one bridge.

13. The kit of parts according to claim 1, further comprising a coupling disc and a spring, wherein the coupling disc is configured to be forced out of engagement with the carrier under an influence of spring action by the spring, and is further configured to be displaced against the spring action upon the key insertion, toward the carrier along the longitudinal axis of the inner lock housing part, thereby enabling the non-rotatable coupling between the outer cylinder and the carrier upon the key insertion.

14. The kit of parts according to claim 1, wherein the inner lock housing part, viewed in the direction of the longitudinal axis of the inner lock housing part, has a substantially constant profile, and wherein each of the one or more lock housing extension parts, viewed in the direction of the longitudinal axis of the inner lock housing part, has a substantially constant profile corresponding to the profile of the inner lock housing part.

15. The kit of parts according to claim 1, wherein the inner lock housing part, viewed in the direction of the longitudinal axis of the inner lock housing part, has a substantially constant profile, wherein the outer lock housing part, viewed in the direction of the longitudinal axis of the inner lock housing part, has a substantially constant profile, wherein the profile of the outer lock housing part corresponds to the profile of the inner lock housing part, and wherein the profiles of the inner and outer lock housing parts are in line with each other.

16. The kit of parts according to claim 1, wherein the panel is a door.

* * * * *